3,207,714
FOAMABLE RESINOUS COMPOSITIONS EMPLOYING AZO-BIS-ALKYLPHOSPHONATES AND CORRESPONDING ACIDS
Peter L. de Benneville, Philadelphia, and Heinz W. Blessing, Levittown, Pa., assignors to Rohm & Haas Company, Philadelphia, Pa., a corporation of Delaware
No Drawing. Filed Jan. 11, 1963, Ser. No. 250,760
11 Claims. (Cl. 260—2.5)

The present application is a continuation-in-part of application Serial No. 171,822, filed February 8, 1962.

This invention deals with foamable resinous compositions employing azo-bis-alkylphosphonates and corresponding acids. The azo-bis-alkylphosphonates employed are represented by the formula

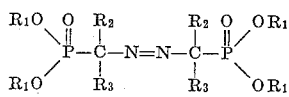

In the above formula $R_1$ represents hydrogen, alkyl and cycloalkyl of 1 to 12 carbon atoms, preferably two to eight carbon atoms. $R_2$ and $R_3$ are hydrocarbon groups of up to about 12 carbon atoms, preferably alkyl, cycloalkyl, alkylcycloalkyl, arylalkyl, arylalkenyl, alkylarylalkyl, aryl, and alkenyl of three to twelve carbon atoms. $R_2$ and $R_3$ taken collectively with the carbon atom to which they are attached may form an alicyclic ring of 3 to 9 carbon atoms. Preferably, the total number of carbon atoms in all of the $R_1$, $R_2$ and $R_3$ groups should not exceed 34. This preference is based on high yields and high purity of products and relative ease of preparation.

Typically, $R_1$ may represent hydrogen, methyl, ethyl, isopropyl, tert-butyl, octyl, phenyl, butylphenyl, naphthyl, and methylnaphthyl. Illustratively, $R_2$ and $R_3$ individually may represent methyl, propyl, isobutyl, tert-octyl, alkyl, butenyl, hexenyl, octenyl, cyclobutyl, cyclohexyl, benzyl, phenylbutyl, phenyl, methylnaphthyl. $R_2$ and $R_3$ collectively, including the carbon atom to which they are attached, typically represent cyclopropylidene, cyclopentylidene, cyclohexylidene, 2-methyl cyclohexylidene, or cyclooctylidene.

The azo-bis-alkylphosphonates of the present invention are prepared by reacting an α-aminoalkylphosphonate having the following formula

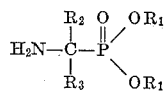

or mixture thereof, with a stable hypochlorite. When $R_1$ is hydrogen the product of this invention must be prepared by hydrolyzing a corresponding azo ester wherein $R_1$ is other than hydrogen, such as methyl, ethyl, or the like.

The hypochlorite employed may be any stable hypochlorite, preferably an alkali metal, an alkaline earth metal, or a ($C_4$–$C_5$) tert-alkyl hypochlorite. The hypochlorite may be employed as such or may be prepared in situ by passing chlorine into an aqueous system of an alkali metal hydroxide or an alkaline earth hydroxide. The hypochlorite may be prepared in solutions containing methanol, ethanol, propanol, butanol, pentanol, or the like. Typical embodiments includes the hypochlorites of lithium, sodium, potassium, calcium, and barium, as well as tert-butyl hypochlorite, and tert-amyl hypochlorite and the like.

The reaction between the hypochlorite and the α-aminoalkylphosphonate is on an equimolecular basis but it is preferred to use an excess of hypochlorite in order to assure highest yields. The hypochlorites may be used in concentrated solutions, although it is preferred to use concentrations of about 5 to 10% of the hypochlorite. It is usually preferred to have an excess of base present in the reaction system.

The present reaction may be carried out entirely in an aqueous system, although lower alkanols may be employed in order to increase the solubility of the α-aminoalkylphosphonate and the hypochlorite reactants. Reaction temperatures in the range of about −30° C. to 35° C. employed, if desired, as long as the reaction system doesn't freeze. Alcohols such as tert-butanol may be employed in the reaction system in order to permit lower reaction temperatures by maintaining the reaction system in a homogeneous state. It is preferred to conduct the reaction by adding the α-aminoalkylphosphonate to the hypochlorite or to add the two reactants substantially simultaneously to the reaction system. The product is obtained as an oil or solid which is insoluble in the reaction system.

The azo-bis-alkylphosphonate may be readily separated in high purity and used without any additional steps of purification. If the product is an oil it is readily separated by extraction with ethers such as with ethyl ether, or hexane, benzene, toluene, chloroform, carbon tetrachloride, ethylene chloride, or other usual extractants. As a solid, the product may be isolated by filtration. In order to assure the highest degrees of purity of product, if an excess amount of the α-aminoalkylphosphonate has been employed, the reaction mixture is treated with dilute mineral acid, such as hydrochloric, sulfuric or the like, in order to form the amine salt of the excess α-aminoalkylphosphonate. This salt is soluble in the aqueous layer and will not contaminate the product. If it is desired to have a compound that has increased water solubility, it is possible to convert the ester products to partial esters or acids by standard hydrolysis techniques, such as by heating the ester product in aqueous alkaline or acid systems. It is preferred, largely for reasons of compatability, to employ the ester form of the azo-bis-alkylphosphonates.

The products of the present invention are converted to nitrogen and a free radical by heating at relatively low temperatures. The initial temperatures of conversion are readily determinable since the conversion temperature is observable because of the formation of abundant amounts of nitrogen gas. For instance, when $R_1$ represents an ethyl group the following are the conversion temperatures for compounds having the identified $R_2$ and $R_3$ substituents.

| $R_2$ | $R_3$ | Conversion Temperature, C. |
|---|---|---|
| $CH_3$ | $CH_3$ | 135 |
| $CH_3$ | $C_2H_5$ | 120 |
| $C_2H_5$ | $C_2H_5$ | 108.5 |
| $CH_3$ | $C_3H_5$ | 112 |
| $CH_3$ | i-$C_4H_9$ | 110 |
| —$CH_2CH_2CH_2CH_2CH_2$— | | 118 |

The azo-bis-alkylphosphonates are prepared according to the following illustrative examples.

Example 1

O,O'-diethyl-2-aminopropyl-2-phosphonate (9.4 parts) is added dropwise to a stirred solution of sodium hypochlorite prepared from sodium hydroxide (8 parts), water (100 parts), and chlorine (4.5 parts). The temperature of the reaction mixture is maintained below 7° C. during the addition of the aminophosphonate. Stirring is continued for 2 hours after addition is completed while maintaining the temperature of the mixture below 10° C. On storing in a refrigerator overnight, the product separates as an oil from the mixture. The azo-phosphonate is isolated by ethyl ether extraction of the product mixture. Evaporation of the ether extract leaves the azophosphonate as a yellow oil (8.16 parts, $n_D{}^{26}=1.4459$). The product contains 6.93% nitrogen (7.24% theoretical), and 15.41% phosphorous (16.93% theoretical). The product has the structure

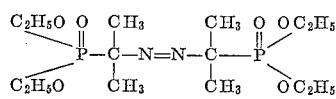

Conversion of a sample of this azophosphonate at 165 C. in a vacuum line gives a nitrogen pressure which is 90–95% of the theoretical value. The converted product is a high-boiling yellow oil. This compound contains 46.59% carbon (46.94% theoretical), 9.19% hydrogen (9.00% theoretical), 16.89% phosphorus (17.28% theoretical). The product has the formula

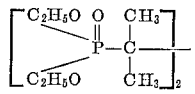

Following the same oxidation procedure, the following azophosphonates are prepared:

| $R_1=C_2H_5$, | $R_2$ | $R_3$ |
| --- | --- | --- |
| | $CH_3$ | $C_2H_5$ |
| | $CH_3$ | $i\text{-}C_4H_9$ |
| | $CH_3$ | $C_6H_5$ |
| | $C_2H_5$ | $C_2H_5$ |
| | —$CH_2CH_2CH_2CH_2CH_2$— | |

Example 2

O,O' - diethyl-1-amino - 1 - isobutyl-3-methylbutylphosphonate (33.5 parts) is added dropwise over a two hour period to a stirred aqueous alkaline sodium hypochlorite solution (270.4 parts) prepared previously by passing chlorine (18.4 parts) into aqueous sodium hydroxide solution (32 parts of sodium hydroxide in 400 parts of water). The reaction mixture is maintained at 1–2° C. during the addition of the aminophosphonate. Stirring is continued for 4 hours after addition is completed. The reaction mixture is stored in a refrigerator overnight. The azophosphonate which separates from the oxidation mixture as a light yellow oil is isolated by ether extraction. Unreacted aminophosphonate (9.3 parts) is recovered by washing the ether extracts with dilute aqueous 10% hydrochloric acid followed by neutralization with base.

The acid-washed ether solution of the azophosphonate is dried over anhydrous sodium sulfate. Evaporation of the ether at room temperature under vacuum gives 1,1'-azo-bis(O,O' - diethyl 1-isobutyl-3-methylbutylphosphonate) (23 parts) of the structure:

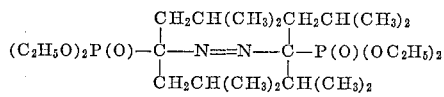

Similarly, oxidation of O,O'-dibutyl 1-amino-1-methylethylphosphonate and O,O'-di(2-ethyl)hexyl 1-amino-1-methylethylphosphonate by the same general procedure gives the corresponding azophosphonates which separate as light yellow viscous oils from the oxidation mixture, and can be purified if necessary by washing with dilute 10% hydrochloric acid. Using the same procedure, O,O'-diethyl 1-amino-1-methylundecylphosphonate is oxidized to 1,1'-azo-bis-(O,O'-diethyl 1-methylundecylphosphonate). Similarly, oxidation of O,O'-diethyl 1-amino-1-methyl-4-pentenylphosphonate and of O,O'-diethyl 1-amino-1-methyl-5-phenyl-3-pentenylphosphonate give 1,1'-azo-bis-(O,O'-diethyl 1-methyl-4-pentenylphosphonate) and 1,1'-azo-bis-(O,O'-diethyl 1-methyl-5-phenyl-3-pentenylphosphonate), respectively. These products are viscous oils which decompose with evolution of nitrogen when heated above 100° C.

Example 3

Dry ammonia is passed into a stirred mixture of diethyl phosphite (55.3 parts) and methyl cyclopropyl ketone (33.7 parts) for 1 hour at room temperature, then for 5 hours while maintaining the reaction mixture at 50° C. The mixture is left at ambient temperature for several days and is then filtered to remove solid by-product (17 parts). The filtrate is stripped of unreacted starting materials by heating to 95° at 0.7 mm. Hg. The stripped residue is a pale yellow oil (56.1 parts) and is identified by elemental analysis as O,O'-diethyl 1-amino-1-cyclopropylethylphosphonate.

The aminophosphonate is oxidized to the azophosphonate as follows:

The aminophosphonate (44.25 parts) is dropped over a 3-hour period into a stirred aqueous alkaline sodium hypochlorite solution previously prepared by passing chlorine (18.4 parts) into a cold solution of sodium hydroxide (32 parts) in water (400 parts). The reaction temperature is 1.2–2.5° C. during the addition of the aminophosphonate. Stirring is continued for 3 hours while maintaining the temperature of the reaction mixture below 6° C. The azophosphonate separates from the mixture as a heavy pale green oil on standing and is isolated by ether extraction. When heated in a capillary tube the azophosphonate starts to decompose at 98° C. with evolution of nitrogen gas.

Example 4

Dry ammonia is passed into a stirred mixture of diethyl phosphite (69.1 parts) and cyclohexanone (49.1 parts). The formation of the aminophosphonate is exothermic and the temperature of the reaction mixture gradually rises from 28° to 43° C. over a 2-hour period. When the exotherm subsides, the reaction mixture is heated to 50° C. and maintained at this temperature for 4.5 hours under an ammonia atmosphere.

The product mixture is allowed to stand at ambient temperature overnight and is then stripped of unreacted diethyl phosphite and excess ammonia by heating to 115° C. at 5 mm. Hg. The aminophosphonate contained in the residue is separated from unreacted cyclohexanone by converting it to the picrate. The stripped residue is treated with a saturated solution of picric acid in ether. The ether-insoluble yellow picrate is filtered from the solution, air-dried, and recrystallized twice from ethanol to give 58.9 parts of pure product, melting point 175–6° C.

O,O'-diethyl 1-amino-1-cyclohexylphosphonate is regenerated from the picrate (55.6 parts) by treatment with excess aqueous sodium hydroxide solution while cooling in an ice bath. The regenerated aminophosphonate (30.9 parts) is recovered by ether extraction as a light yellow oil. It is free of cyclohexanone but contains a small amount of sodium picrate which does not interfere in the oxidation step.

The aminophosphonate (25.8 parts) is converted to the azo phosphonate (19.2 parts) by oxidation with alkaline hypochlorite solution as illustrated in Example 2. The solid azo phosphonate which separates from the oxidation mixture is obtained as a light yellow powder (melting point 60–63° C.) by filtration, washing with cold water, and drying under vacuum.

By a similar procedure, 1,1'-azo-bis-(O,O'-diethyl cyclooctylphosphonate) is prepared from O,O'-diethyl-1-aminocyclooctylphosphonate, and 1,1'-azo-bis-(O,O'-diethyl cyclononylphosphonate) from O,O'-diethyl-1-aminocyclononylphosphonate. They are obtained as light-yellow oils, which evolve about one mole of nitrogen per mole on heating to 150° C.

*Example 5*

O,O'-diethyl - 1 - amino-1-α-naphthylethylphosphonate (9.23 parts) isolated from the reaction of equimolar amounts of methyl α-naphthyl ketone and diethyl phosphite with excess ammonia as the picrate and regenerated by treating the picrate with aqueous sodium hydroxide is dropped over a 2-hour period into a stirred alkaline sodium hypochlorite solution maintained at 0.7–1.5° C. As the amino is added, yellow, pasty solids are formed. Stirring is continued for 4 hours at 0.5–1.2° C. During this period the yellow solids turn white and become more finely divided. After storing in a refrigerator overnight, the azophosphonate is filtered from the reaction mixture, washed with water, and dried at room temperature under vacuum. The crude azophosphonate (9.31 parts) has a melting point of 78–9° C. and starts to decompose at 107° C.

By a similar procedure 1,1'-azo-bis-(O,O'-diethyl-1-benzylethylphosphonate) is prepared by oxidation of the aminophosphonate obtained from the reaction of methyl benzyl ketone with diethyl phosphite and ammonia. Similarly, 1,1'-azo-bis - (O,O'-diethyl-1-p-tolylethylphosphonate) is obtained by the oxidation of O,O'-diethyl-1-amino-1-p-tolylethylphosphonate.

*Example 6*

O,O'-diethyl - 1 - amino - 1 - phenyl benzylphosphonate hydrochloride (21.35 parts) is added in small portions over a 1.5 hour period to a stirred aqueous alkaline sodium hypochlorite solution prepared by passing chlorine gas (5.5 parts) into a cold solution of sodium hydroxide (12.0 parts) in water (145 parts). The temperature is held at 1–1.5° C. during the addition of the hydrochloride. Stirring of the reaction mixture is continued for 5 hours at 1.5–2° C. White, gummy solids are formed during the oxidation period. The reaction mixture is extracted with ether and the combined ether extracts are washed with dilute hydrochloric acid to remove unreacted aminophosphonate. Evaporation of the ether extracts under reduced pressure gives the crude azophosphonate (5.95 parts) as a light tan solid, melting point 110–111° C. It decomposes with nitrogen evolution when heated to 112° C.

*Example 7*

O,O'-diethyl-1-amino-1-phenylethylphosphonate is prepared by reacting diethyl phosphite (55.3 parts) and acetophenone (48.0 parts) with ammonia gas at atmospheric pressure for 4.5 hours at 50° C., followed by 2.75 hours at 100° C. The aminophosphonate is isolated from the reaction mixture as the picrate (58 parts) recrystallized from ethanol and regenerated by treating the picrate with an excess of aqueous sodium hydroxide. The aminophosphonate is thereby obtained as a viscous yellow oil (23.1 parts) containing a small amount of sodium picrate.

In a mixture of 50 parts of distilled water and 50 parts of ice is suspended 11.2 parts of calcium oxide. Chlorine gas is passed in at 3–5° C. until there is a gain equal to 4.45 parts of chlorine gas. To the mixture is then added, with stirring, 12.9 parts of the aminophosphonate prepared above, over a half-hour period, at 5–10° C. The mixture is placed in the refrigerator at 5° overnight, and then filtered. The solid is extracted with hot methylal, and filtered off while hot. The methylal is evaporated under vacuum, and the resulting azophosphonate recovered as a white solid, melting point 82–83° C., decomposing about 112° C.

In a similar fashion, from methyl hexyl ketone, there is prepared O,O'-diethyl 1-amino-1-methylheptylphosphonate. This is oxidized in the same manner with calcium hypochlorite. The entire reaction mixture is extracted with ether, and the solids washed with ether. Upon evaporation these ether extracts give a neutral yellow-green oil, analyzing correctly for the structure:

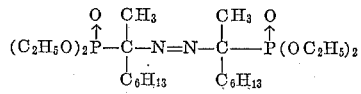

*Example 8*

To 50 parts of water cooled to about 0° C. are added 3.8 parts of sodium chloride, 4.4 parts of sodium hydroxide and 10.9 parts of tert. butyl hypochlorite. To the mixture is added, dropwise over a two hour period at 2–4° C., 12.3 parts of O,O'-diethyl-1-amino-1,3-dimethylbutylphosphonate, having the structure:

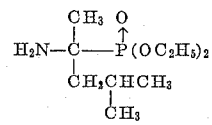

One or more of the defined azo-bis-alkylphosphonates is mixed with a plastisol to form a foamosol. The amount of such azo-bis-alkylphosphonate added can vary from about 1% to about 35% of the weight of the plastisol. There is no sharp lower limit, since as small an amount may be used as will give a desired degree of foaming. The upper limit is fairly well determined by the gas which can be held by the plastic composition under the particular conditions of blowing and by the particular azo-bis-alkylphosphonate selected. It is generally preferred that in pressure blowing the azo-bis-alkylphosphonate be from 10% to 25% of the weight of the plastisol. For free blowing the preferred range is from about 1% to about 5%.

It is desirable to disperse the azo-bis-alkylphosphonate as uniformly as possible throughout the plastisol. This is readily achieved in most instances by adding and stirring since nearly all of the azo-bis-alkylphosphonates are liquid. In the few instances when the azo-bis-alkylphosphonate is solid it may be prepared in a finely divided state, a particle size of not over 100 mesh giving highly uniform foams. The azo-bis-alkylphosphonate is stirred or mixed thoroughly with the plastisol or ground therewith. In these ways a foamosol is prepared, which composition yields uniformly foamed plastic objects when heated to temperatures between 110° C. and 200° C.

The azo-bis-alkylphosphonates may be used for forming shaped objects by heating a foamosol in a confined spaced under pressure at temperatures from about 140° to 200° C., cooling the thus heated material, best under pressure, and heating it under free conditions at 100° to 125° C. The product thus obtained is an expanded, cellular, flexible plastic in which the cells are separate spaces uniformly distributed throughout.

The foamosol may also be heated under free conditions with decomposition of the azo-bis-alkylphosphonate therein and fluxing of the plastisol. Under these conditions the product contains coarse openings which are usually interconnected as in a sponge. Temperatures of heating are between 100° and 200° C., the temperature being raised progressively to cause decomposition of the blowing agent and then to ensure fluxing of the dispersion of resin in plasticizer.

The term plastisol has been given to a dispersion of a polyvinyl chloride resin in a plasticizer which has relatively little solvent action on the resin at room temperatures. Plastisols are essentially liquid at moderate temperatures but are converted to tough, rubbery plastics when heated at temperatures which cause fluxing of the dispersion. For some applications a plastisol may be diluted with a volatile organic diluent. The composition is then called an organosol. Use of such a system is within the contemplation of this invention.

The resins used for preparing plastisols are primarily polyvinyl chloride and copolymers from vinyl chloride in chief amount modified by the presence of some other polymerizable ethylenic compound, such as vinyl acetate, vinyl propionate, vinyl butyrate, vinylidene chloride, methyl maleate, ethyl maleate, methyl fumarate, or ethyl fumarate. The polymer must be in the form of fine particles, as from emulsion polymerization, to be blended with the plasticizer.

When the polymer is in the form of fine, unagglomerated particles, it may be mixed with plasticizer merely by stirring. With agglomerated particles grinding or milling may be necessary. It is desirable in any case that the resin particles have high density and present a minimum surface for a given particle weight, indicating the desirability of a spherical shape. Particle sizes of 0.02 to two microns in diameter are commercially available in dispersion grades of resin.

Plasticizers for dispersing one or more of the vinyl chloride polymers may be of the monomeric or polymeric types. Frequently mixtures of both types are desirable. In the case where heating is conducted in a closed mold both types of plasticizer can be used with, perhaps, some preference for monomeric materials. In any situation an optimum plasticizer system can be worked out with due consideration of a given resin, the particular blowing agent and the absence or presence of pigments, fillers, or other added materials.

Typical monomeric plasticizers include di-2-ethylhexyl phthalate, dicapryl phthalate, diisooctyl phthalate, diisononyl phthalate, dibutyl adipate, dibutyl sebacate, dioctyl azelate, dioctyl sebacate, triphenyl phosphonates, and alkyl diphenyl phosphonates. Typical polymeric plasticizers include soluble condensates from dicarboxylic acids, such as adipic, azelaic, or sebacic, and one or more glycols, such as ethylene, propylene, diethylene glycols, and the like.

A plasticizer or a mixture of plasticizers is chosen to give good wetting and dispersing of resin particles without solution thereof at low to moderate temperatures and at the same time to provide a favorable porous structure in the fluxed product. At elevated temperautres the mixture of resin and plasticizer fuses or fluxes with the resin becoming solvated. The ratio of resin to plasticizer here ordinarily varies from 2:1 to 2:3.

The mixture of resin and plasticizer may be modified with added materials. For example, volatile dispersants such as ketones and hydrocarbons may be added. Also pigments, fillers, viscosity reducing agents, and stabilizers may be added. Usually such materials are dispersed in a portion of plasticizer and this mixture is combined with the dispersion of resin in plasticizer.

The present invention may be more fully understood from the following examples which are offered by way of illustration and not by way of limitation. Parts by weight are used throughout.

*Example A*

There are mixed 100 parts of a dispersion grade of a copolymer of vinyl chloride and vinyl acetate, 100 parts of dioctyl phthalate, six parts of basic lead silicate and 20 parts of 1,1'-azo-bis-(O,O'-diethyl 1-methylethylphosphonate). The mixture is milled to ensure homogeneity. A mold is filled with the mixture, and placed in a press where it is heated to 375° F. for 10 minutes. The mold is cooled and the pressure is released. The molded object is heated for 20 minutes in an oven at 225°. The resulting blown object had a density of 8 lb. per cu. ft., with uniform closed cells throughout.

Similarly there are prepared valuable blown products using as the bolwing agent 1,1'-azo-bis-(O,O'-diethyl 1-methyl-5-phenyl-3-pentenylphosphonate), 1,1' - azo-bis-(O,O'-diethyl 1-amino-1-cyclohexylphosphonate) or 1,1'-azo-bis-(O,O'-diethyl-1-benzylethylphosphonate).

*Example B*

There are mixed 100 parts of a dispersion grade of a copolymer of vinyl chloride and vinyl acetate, 50 parts of dioctylphthalate, 30 parts of benzyl butyl phthalate, 20 parts of octyl epoxystearate, 2 parts of barium-cadmium stearate stabilizer, and 8 parts of 1,1'-azo-bis-(O,O'-diethyl 1-methylethylphosphonate). The mixture is milled to ensure homogeneity. Ten grams of this foamosol is weighed into a quart paint can lid. It is placed in an oven at 375° F. for a period of ten minutes. There results a blown foam which is white in color, which has a very fine texture, and which has a density of 18 lbs. per cu. ft.

Similarly there are prepared valuable blown products using as the blowing agent 1,1'-azo-bis-(O,O'-diethyl-1-amino-1-phenylethylphosphonate) or 1,1'-azo - bis-(O,O'-diethyl 1-amino-1,3-dimethylbutylphosphonate).

We claim:
1. A composition comprising a mixture of a fluid dispersion of polymerized vinyl chloride with a plasticizer therefor and a compound having the formula

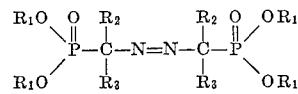

in which
$R_1$ represents alkyl groups of up to 12 carbon atoms,
$R_2$ and $R_3$ are hydrocarbon groups of up to about 12 carbon atoms selected from the class consisting of alkyl, cycloalkyl, arylalkyl, aryl, and alkenyl considered singly and considered collectively with the carbon atom to which they are attached form an alicyclic ring of 3 to 9 carbon atoms.

2. A composition according to claim 1 in which $R_1$, $R_2$ and $R_3$ represent alkyl groups.

3. A composition according to claim 1 in which $R_1$, $R_2$ and $R_3$ represent alkyl groups and the total number of carbon atoms in all of the $R_1$, $R_2$ and $R_3$ groups is no more than 34.

4. A composition according to claim 1 in which said compound is present by weight in the range of about 1 to 35%.

5. A composition according to claim 1 in which said compound is present by weight in the range of about 10 to 25%.

6. A composition according to claim 1 in which said compound is present by weight in the range of about 1 to 5%.

7. A process for preparing expanded plastic objects which comprises mixing a plastisol comprising a fluid dispersion of polymerized vinyl chloride with a plasticizer therefor and a compound having the formula

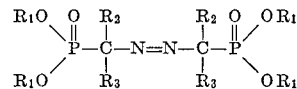

in which
$R_1$ represents alkyl groups of up to 12 carbon atoms,
$R_2$ and $R_3$ are hydrocarbon groups of up to about 12 carbon atoms selected from the class consisting of alkyl, cycloalkyl, arylalkyl, aryl, and alkenyl considered singly and considered collectively with the carbon atom to which they are attached form an alicyclic ring of 3 to 9 carbon atoms and heating the resulting mixture to temperatures at which said compound is decomposed and the plastisol is fluxed.

8. A process according to claim 7 in which $R_1$, $R_2$ and $R_3$ represent alkyl groups.

9. A process according to claim 7 in which said compound is present by weight in the amount of about 1 to 35%.

10. A process according to claim 7 in which said compound is present by weight in the amount of about 10 to 25%.

11. A process according to claim 7 in which said compound is present by weight in the amount of about 1 to 5%.

References Cited by the Examiner
UNITED STATES PATENTS 3,098,831  7/63  Carr _____ 260—2.5

MURRAY TILLMAN, *Primary Examiner.*

JAMES A. SEIDLECK, *Examiner.*